United States Patent
Wang et al.

(10) Patent No.: US 12,005,581 B1
(45) Date of Patent: Jun. 11, 2024

(54) CONTROL METHOD, ELECTRONIC DEVICE AND STORAGE MEDIUM

(71) Applicants: Zhejiang Hengyi Petrochemical Co., Ltd., Hangzhou (CN); Zhejiang Hengyi Polyamide Co., Ltd., Hangzhou (CN)

(72) Inventors: Peng Wang, Hangzhou (CN); Xiantao Peng, Hangzhou (CN); Junwei Zhang, Hangzhou (CN); Zhangzhong Cheng, Hangzhou (CN); Jifei Chen, Hangzhou (CN); Yanjun Jiang, Hangzhou (CN)

(73) Assignees: Zhejiang Hengyi Petrochemical Co., Ltd., Hangzhou (CN); Zhejiang Hengyi Polyamide Co., Ltd., Hangzhou (CN)

( * ) Notice: Subject to any disclaimer, the term of this patent is extended or adjusted under 35 U.S.C. 154(b) by 0 days.

(21) Appl. No.: 18/541,958

(22) Filed: Dec. 15, 2023

(30) Foreign Application Priority Data

Jul. 27, 2023 (CN) .......................... 202310937043.1

(51) Int. Cl.
```
B65G 61/00    (2006.01)
B25J 9/16     (2006.01)
G06V 10/77    (2022.01)
G06V 10/82    (2022.01)
G06V 20/50    (2022.01)
```
(52) U.S. Cl.
CPC .............. *B25J 9/163* (2013.01); *B25J 9/1697* (2013.01); *G06V 10/7715* (2022.01); *G06V 10/82* (2022.01); *G06V 20/50* (2022.01)

(58) Field of Classification Search
CPC ......... B25J 9/16; B25J 9/1697; G06T 7/0004; G06T 7/11; G06T 7/136; G06V 10/7715; G06V 10/82; G06V 20/50
See application file for complete search history.

(56) References Cited

U.S. PATENT DOCUMENTS

| | | | |
|---|---|---|---|
| 2021/0395008 A1* | 12/2021 | Zheng | G06Q 10/087 |
| 2022/0332505 A1* | 10/2022 | Min | B65G 1/1373 |
| 2023/0073479 A1* | 3/2023 | Zhou | G01C 21/206 |
| 2023/0195126 A1* | 6/2023 | Ha | G06T 7/50 |
| | | | 701/26 |
| 2023/0205147 A1* | 6/2023 | Park | H01L 21/68707 |
| | | | 700/259 |
| 2023/0376046 A1* | 11/2023 | Yoon | E04H 6/36 |

* cited by examiner

*Primary Examiner* — Dalena Tran
(74) *Attorney, Agent, or Firm* — Wolf, Greenfield & Sacks, P.C.

(57) ABSTRACT

Provided is a control method, an electronic device and a storage medium. The method comprises: when a first yarn spindle with a first identifier is transported on a transport channel and determining that the number of first yarn spindles located in a preset area needs to be detected, detecting the first number of first yarn spindles located in the preset area; and when the first number of first yarn spindles is less than the total number of yarn spindles that the first mechanical arm can grab, determining the target number of first yarn spindles to be replenished, and generating a first control instruction to instruct a second mechanical arm to grab the target number of first yarn spindles from a target trolley associated with the first identifier of the first yarn spindle, and place the target number of first yarn spindles in the transport channel or preset area.

20 Claims, 5 Drawing Sheets

---

When a first spindle with yarn with a first identifier is transported on a transport channel and when determining that the number of first spindles with yarn located in a preset area needs to be detected, detecting the first number of first spindles with yarn located in the preset area  — S101

When the first number of first spindles with yarn located in the preset area is less than the total number of spindles with yarn that the first mechanical arm can grab, determining the target number of first spindles with yarn that need to be replenished, and generating a first control instruction  — S102

```
┌─────────────────────────────────────────────────────────────┐
│ When a first spindle with yarn with a first identifier is   │
│ transported on a transport channel and when determining     │
│ that the number of first spindles with yarn located in a    │  ── S101
│ preset area needs to be detected, detecting the first       │
│ number of first spindles with yarn located in the           │
│ preset area                                                 │
└─────────────────────────────────────────────────────────────┘
                              │
┌─────────────────────────────────────────────────────────────┐
│ When the first number of first spindles with yarn located   │
│ in the preset area is less than the total number of         │
│ spindles with yarn that the first mechanical arm can grab,  │  ── S102
│ determining the target number of first spindles with yarn   │
│ that need to be replenished, and generating a first         │
│ control instruction                                         │
└─────────────────────────────────────────────────────────────┘
```

CONTROL METHOD, ELECTRONIC DEVICE AND STORAGE MEDIUM

CROSS-REFERENCE TO RELATED APPLICATIONS

The present application claims priority to Chinese Patent Application No. CN202310937043.1, filed with the China National Intellectual Property Administration on Jul. 27, 2023, the disclosure of which is hereby incorporated herein by reference in its entirety.

TECHNICAL FIELD

The present disclosure relates to a field of data processing technology, and in particular, to a control method and apparatus, a device and a storage medium.

BACKGROUND

During the palletizing process in the automatic packaging workshop, the number of spindles with yarn in the working area where the mechanical arm is located is less than the number of spindles with yarn that the mechanical arm can grab, so that the normal palletizing cannot be carried out; furthermore, if it is necessary to change batches, the spindles with yarn with two batch numbers will appear in the working area where the mechanical arm is located. At this time, if the palletizing is carried out in the original manner, the production accident of mixed batch numbers may occur, that is, the batch numbers are mixed, causing the spindles with yarn with different batch numbers to be palletized together, and thus causing the greater loss to the manufacturer.

SUMMARY

The present disclosure provides a control method and apparatus, a device and a storage medium, to solve or alleviate one or more technical problems in the prior art.

In a first aspect, the present disclosure provides a control method, including:

when a first spindle with yarn with a first identifier is transported on a transport channel and when determining that the number of first spindles with yarn located in a preset area needs to be detected, detecting the first number of first spindles with yarn located in the preset area; wherein the transport channel is a channel for transporting spindles with yarn in an automatic packaging workshop and is used to transport the transported spindles with yarn to the preset area; the preset area is a working area radiated by a first mechanical arm; and the first mechanical arm is used to grab a plurality of spindles with yarn in the radiated working area and transfer the plurality of spindles with yarn grabbed to a target position; and when the first number of first spindles with yarn located in the preset area is less than the total number of spindles with yarn that the first mechanical arm can grab, determining the target number of first spindles with yarn that need to be replenished, and generating a first control instruction; wherein the first control instruction is used to instruct a second mechanical arm to grab the target number of first spindles with yarn from a target trolley associated with the first identifier of the first spindle with yarn, and place the target number of first spindles with yarn in the transport channel or preset area.

In a second aspect, the present disclosure provides a control apparatus, including:

a detection unit configured to, when a first spindle with yarn with a first identifier is transported on a transport channel and when determining that the number of first spindles with yarn located in a preset area needs to be detected, detect the first number of first spindles with yarn located in the preset area; wherein the transport channel is a channel for transporting spindles with yarn in an automatic packaging workshop and is used to transport the transported spindles with yarn to the preset area; the preset area is a working area radiated by a first mechanical arm; and the first mechanical arm is used to grab a plurality of spindles with yarn in the radiated working area and transfer the plurality of spindles with yarn grabbed to a target position; and a processing unit configured to, when the first number of first spindles with yarn located in the preset area is less than the total number of spindles with yarn that the first mechanical arm can grab, determine the target number of first spindles with yarn that need to be replenished, and generate a first control instruction; wherein the first control instruction is used to instruct a second mechanical arm to grab the target number of first spindles with yarn from a target trolley associated with the first identifier of the first spindle with yarn, and place the target number of first spindles with yarn in the transport channel or preset area.

In a third aspect, provided is an electronic device, including:

at least one processor; and a memory connected in communication with the at least one processor.

The memory stores an instruction executable by the at least one processor, and the instruction, when executed by the at least one processor, enables the at least one processor to execute the method of any embodiment of the present disclosure.

In a fourth aspect, provided is a non-transitory computer-readable storage medium storing a computer instruction thereon, and the computer instruction is used to cause a computer to execute the method of any embodiment of the present disclosure.

In a fifth aspect, provided is a computer program product including a computer program, and the computer program implements the method of any embodiment of the present disclosure, when executed by a processor.

In this way, the solution of the present disclosure can generate the control instruction when the first number of first spindles with yarn located in the preset area is less than the total number of spindles with yarn that the first mechanical arm can grab, so as to automatically replenish the first spindles with yarn with the first identifier, thus providing support for smooth automatic palletizing, and simultaneously avoiding the spindles with yarn with different batch numbers from being palletized together. Compared with the existing method of manual intervention, the solution of the present disclosure can achieve the complete automated process that requires no human intervention, and lay the foundation for greatly improving the packaging efficiency.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

In the accompanying drawings, the same reference numbers represent the same or similar parts or elements throughout the accompanying drawings, unless otherwise specified. These accompanying drawings are not necessarily drawn to scale. It should be understood that these accompanying drawings only depict some embodiments provided according to the present disclosure, and should not be considered as limiting the scope of the present disclosure.

DETAILED DESCRIPTION

The present disclosure will be described below in detail with reference to the accompanying drawings. The same reference numbers in the accompanying drawings represent elements with identical or similar functions. Although various aspects of the embodiments are shown in the accompanying drawings, the accompanying drawings are not necessarily drawn to scale unless specifically indicated.

In addition, in order to better illustrate the present disclosure, numerous specific details are given in the following specific implementations. Those having ordinary skill in the art should understand that the present disclosure may be performed without certain specific details. In some examples, methods, means, elements and circuits well known to those having ordinary skill in the art are not described in detail, in order to highlight the subject matter of the present disclosure.

In the automatic packaging workshop, the spindles with yarn in the online trolley or box are placed on the automatic packaging conveyor line, and aggregated to the working area where the mechanical arm is located through weighing, diversion and bagging; the mechanical arm grabs the spindles with yarn from the working area, and places them in the palletizing position for palletizing; after the palletizing is completed, a top cover is added, the belt is tied, the film is wrapped, the shipping mark is pasted, and finally the spindles with yarn take off the line and are transported to the warehouse. Here, in the process of palletizing the spindles with yarn, the spindles with yarn with the same batch number need to be palletized together.

In the automatic packaging process of spindles with yarn, the packaging task of the current batch number can be completed after the packaging task of the current batch number meets the business requirement, and the spindles with yarn with the next batch number are packaged, that is, the batch is changed. However, the following situation may occur during the batch change process: the number of spindles with yarn in the working area where the mechanical arm is located is less than the number of spindles with yarn that the mechanical arm can grab in the palletizing process. At this time, the normal palletizing is not possible. In other words, the number of spindles with yarn with the current batch number cannot meet the requirement of palletizing into a complete stack, and the mechanical arm will be in the waiting state; or, the spindles with yarn with two batch numbers appear in the working area where the mechanical arm is located. At this time, if the palletizing is carried out in the original manner, the production accident of mixed batch numbers may occur, that is, the spindles with yarn with different batch numbers are palletized together, thereby affecting the subsequent processing flow. For the above scenarios, the manual intervention is required to avoid the above problems.

Based on this, the solution of the present disclosure proposes a control method to realize the automated process.

Figure 1:
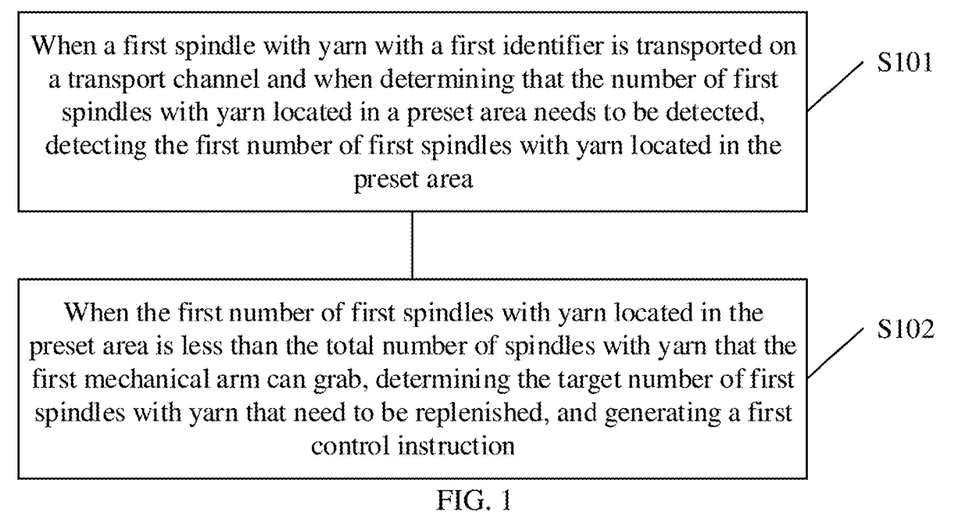
FIG. 1 is a schematic flowchart of a control method according to an embodiment of the present application.

Specifically, FIG. 1 is a schematic flowchart of a control method according to an embodiment of the present application. This method is optionally applied in electronic devices, such as personal computers, servers, server clusters and other electronic devices. This method includes at least a part of the following content. As shown in FIG. 1, this method includes:

Step S101: when a first spindle with yarn with a first identifier is transported on a transport channel and when determining that the number of first spindles with yarn located in a preset area needs to be detected, detecting the first number of first spindles with yarn located in the preset area.

Here, the transport channel is a channel for transporting spindles with yarn in an automatic packaging workshop and is used to transport the transported spindles with yarn to the preset area; and the preset area is a working area radiated by a first mechanical arm. The first mechanical arm is used to grab a plurality of spindles with yarn in the radiated working area and transfer the plurality of spindles with yarn grabbed to a target position. For example, the first mechanical arm can grab a plurality of spindles with yarn from the preset area and transfer the plurality of spindles with yarn grabbed to the palletizing position, to facilitate subsequent packaging and warehousing of the grabbed spindles with yarn.

In a specific example, the first mechanical arm may be a gantry robot.

Step S102: when the first number of first spindles with yarn located in the preset area is less than the total number of spindles with yarn that the first mechanical arm can grab, determining the target number of first spindles with yarn that need to be replenished, and generating a first control instruction.

Here, the first control instruction is used to instruct a second mechanical arm to grab the target number of first spindles with yarn from a target trolley associated with the first identifier of the first spindle with yarn, and place the target number of first spindles with yarn in the transport channel or preset area.

It should be noted that the target trolley associated with the first identifier of the first spindle with yarn may be specifically a preset trolley, and the spindle with yarn on the preset spindle with yarn has the first identifier; and further, in one example, the preset trolley is a specific trolley for replenishing spindles with yarn.

In one example, the target number of first spindles with yarn that need to be replenished is based on the first number of first spindles with yarn located in the preset area and the total number of spindles with yarn that the first mechanical arm can grab; for example, the target number of first spindles with yarn that need to be replenished=the total number of spindles with yarn that the first mechanical arm can grab−the first number of first spindles with yarn located in the preset area.

It can be understood that the number of spindles with yarn that the preset area can accommodate is related to the total number of spindles with yarn that the first mechanical arm can grab. For example, the number of spindles with yarn that the preset area can accommodate is equal to the total number of spindles with yarn that the first mechanical arm can grab.

In one example, the identifier (which may also be referred to as the batch number) of the spindle with yarn may specifically include spindle with yarn information, such as generation specification, product type, etc. of the spindle with yarn. It can be understood that the spindles with yarn produced in the same production batch have the same identifier.

In this way, the solution of the present disclosure can realize the automatic generation of the control instruction when the first spindle with yarn with the first identifier is transported and when the first number of first spindles with yarn located in the preset area is less than the total number of spindles with yarn that the first mechanical arm can grab, so as to automatically replenish the first spindles with yarn with the first identifier, thus providing support for smooth automatic palletizing; compared with the existing method of manual intervention, the solution of the present disclosure can achieve the complete automated process that requires no human intervention, and lay the foundation for greatly improving the packaging efficiency.

Furthermore, the automatically replenished spindles with yarn are spindles with yarn related to the first identifier, such as the first spindles with yarn with the first identifier, thus effectively avoiding the case that the spindles with yarn with two different identifiers appear in the preset area, and then effectively avoiding the spindles with yarn with different identifiers from being palletized together.

In a specific example of the solution of the present disclosure, the execution conditions for detecting the first number of first spindles with yarn located in the preset area are given below; and specifically, the above step of detecting the first number of first spindles with yarn located in the preset area when the first spindle with yarn with the first identifier is transported on the transport channel and when determining that the number of first spindles with yarn located in the preset area needs to be detected (that is, the above step S101), specifically includes one of:

Condition 1: when the first spindle with yarn with the first identifier is transported on the transport channel and when determining that a second spindle with yarn with a second identifier needs to be continuously transported, detecting the first number of first spindles with yarn located in the preset area; where the second identifier is different from the first identifier.

That is to say, when the first spindle with yarn with the first identifier is transported on the transport channel, if the subsequently transported spindles with yarn are spindles with yarn with other identifiers, for example, if the batch needs to be changed, the first number of first spindles with yarn located in the preset area needs to be detected, so as to avoid the appearance of spindles with yarn with two batch numbers in the working area where the first mechanical arm is located during the batch change process, and thereby avoid the spindles with yarn with different batch numbers from being palletized together.

In a specific example, when the condition 1 is used as the condition for performing detection, the method may specifically include:

Step 1-1: when the first spindle with yarn with the first identifier is transported on the transport channel and when determining that a second spindle with yarn with a second identifier needs to be continuously transported, detecting the first number of first spindles with yarn located in the preset area; where the second identifier is different from the first identifier.

Step 1-2: determining whether the first number of first spindles with yarn located in the preset area is less than the total number of spindles with yarn that the first mechanical arm can grab; if so, proceed to step 1-3; otherwise, proceed to step 1-4.

Step 1-3: when the first number of first spindles with yarn located in the preset area is less than the total number of spindles with yarn that the first mechanical arm can grab, determining the target number of first spindles with yarn that need to be replenished, and generating a first control instruction.

Step 1-4: when the first number of first spindles with yarn located in the preset area is equal to the total number of spindles with yarn that the first mechanical arm can grab, determining whether the transport channel also transports other first spindles with yarn; if so, proceed to step 1-5; otherwise, proceed to step 1-6.

Step 1-5: when the first number of first spindles with yarn located in the preset area is equal to the total number of spindles with yarn that the first mechanical arm can grab and the transport channel also transports other first spindles with yarn, generating a second control command, and returning to step 1-2.

Here, the second control instruction is used to instruct the first mechanical arm to re-detect the first number of first spindles with yarn located in the preset area after completing a grabbing task.

Step 1-6: when the first number of first spindles with yarn located in the preset area is equal to the total number of spindles with yarn that the first mechanical arm can grab and there is no first spindle with yarn in the transport channel, generating a third control instruction, where the third control instruction is used to instruct the first mechanical arm to stop running Condition 2: when the first spindle with yarn with the first identifier is transported on the transport channel and when determining that the first spindle with yarn currently placed on the transport channel is the last first spindle with yarn, detecting the first number of first spindles with yarn located in the preset area.

That is to say, when the first spindle with yarn with the first identifier is transported on the transport channel and when determining that the transportation of the first spindle with yarn with the current identifier is about to be completed, the actual number of the first spindles with yarn located in the preset area may be less than the total number of spindles with yarn that the first mechanical arm can grab, so that the normal palletizing cannot be carried out. Therefore, in order to avoid the above problem, it is necessary to detect the first number of first spindles with yarn located in the preset area.

In a specific example, when the condition 2 is used as the condition for performing detection, the method may specifically include:

Step 2-1: when the first spindle with yarn with the first identifier is transported on the transport channel and when determining that the first spindle with yarn currently placed on the transport channel is the last first spindle with yarn, detecting the first number of first spindles with yarn located in the preset area.

Step 2-2: determining whether the first number of first spindles with yarn located in the preset area is less than the total number of spindles with yarn that the first mechanical arm can grab; if so, proceed to step 2-3; otherwise, proceed to step 2-4.

Step 2-3: when the first number of first spindles with yarn located in the preset area is less than the total number of spindles with yarn that the first mechanical arm can grab, determining the target number of first spindles with yarn that need to be replenished, and generating a first control instruction.

Step 2-4: when the first number of first spindles with yarn located in the preset area is equal to the total number of spindles with yarn that the first mechanical arm can grab, determining whether the transport channel also transports other first spindles with yarn; if so, proceed to step 2-5; otherwise, proceed to step 2-6.

Step 2-5: when the first number of first spindles with yarn located in the preset area is equal to the total number of spindles with yarn that the first mechanical arm can grab and the transport channel also transports other first spindles with yarn, generating a second control command, and returning to step 2-2.

Here, the second control instruction is used to instruct the first mechanical arm to re-detect the first number of first spindles with yarn located in the preset area after completing a grabbing task.

Step 2-6: when the first number of first spindles with yarn located in the preset area is equal to the total number of spindles with yarn that the first mechanical arm can grab and there is no first spindle with yarn in the transport channel, generating a third control instruction, where the third control instruction is used to instruct the first mechanical arm to stop running Condition 3: when the first spindle with yarn with the first identifier is transported on the transport channel and when determining that the total number of first spindles with yarn transported by the transport channel does not reach a preset maximum number that the transport channel can carry, detecting the first number of first spindles with yarn located in the preset area.

That is to say, when the first spindle with yarn with the first identifier is transported on the transport channel and when determining that the transportation of the first spindle with yarn with the current identifier is about to be completed, the actual number of the first spindles with yarn located in the preset area may be less than the total number of spindles with yarn that the first mechanical arm can grab, so that the normal palletizing cannot be carried out. Therefore, in order to avoid the above problem, it is necessary to detect the first spindles with yarn located in the preset area.

In a specific example, when the condition 3 is used as the condition for performing detection, the method may specifically include:

Step 3-1: when the first spindle with yarn with the first identifier is transported on the transport channel and when determining that the total number of first spindles with yarn transported by the transport channel does not reach the preset maximum number that the transport channel can carry, detecting the first number of first spindles with yarn located in the preset area.

Step 3-2: determining whether the first number of first spindles with yarn located in the preset area is less than the total number of spindles with yarn that the first mechanical arm can grab; if so, proceed to step 3-3; otherwise, proceed to step 3-4.

Step 3-3: when the first number of first spindles with yarn located in the preset area is less than the total number of spindles with yarn that the first mechanical arm can grab, determining the target number of first spindles with yarn that need to be replenished, and generating a first control instruction.

Step 3-4: when the first number of first spindles with yarn located in the preset area is equal to the total number of spindles with yarn that the first mechanical arm can grab, determining whether the transport channel also transports other first spindles with yarn; if so, proceed to step 3-5; otherwise, proceed to step 3-6.

Step 3-5: when the first number of first spindles with yarn located in the preset area is equal to the total number of spindles with yarn that the first mechanical arm can grab and the transport channel also transports other first spindles with yarn, generating a second control command, and returning to step 3-2.

Here, the second control instruction is used to instruct the first mechanical arm to re-detect the first number of first spindles with yarn located in the preset area after completing a grabbing task.

Step 3-6: when the first number of first spindles with yarn located in the preset area is equal to the total number of spindles with yarn that the first mechanical arm can grab and there is no first spindle with yarn in the transport channel, generating a third control instruction, where the third control instruction is used to instruct the first mechanical arm to stop running.

It should be noted that one of the above conditions needs to be selected for execution based on scene requirements in actual applications, which is not limited in the solution of the present disclosure.

In a specific example of the solution of the present disclosure, when the first spindle with yarn with the first identifier is transported on the transport channel and when determining that the number of first spindles with yarn located in the preset area needs to be detected, the detection may be performed in the following manner, to obtain the first number of first spindles with yarn located in the preset area; specifically, the above step of detecting the first number of first spindles with yarn located in the preset area specifically includes:

obtaining a collected target image containing the preset area; and inputting the target image into a target mixture model to obtain the first number of first spindles with yarn located in the preset area; where the target mixture model is used to detect the number of spindles with yarn located in the preset area in the target image.

That is to say, when detecting the number of first spindles with yarn located in the preset area, firstly the target image containing the preset area is obtained, and secondly the target image is input into the target mixture model, to determine the first number of first spindles with yarn located in the preset area by using the target mixture model.

In one example, the target image may be obtained by an image collection component. Here, the image collection component may specifically include a camera. For example, the target image is obtained by using the camera to perform image collection on the preset area, e.g., shoot the preset area to obtain an image, or perform video collection on the preset area for a preset duration to obtain a plurality of continuous video frames, and select one image from the continuous video frames as the target image.

Further, in an example, the target image may also be obtained by preprocessing the image or video data collected by the image collection component; and the preprocessing may include but not limited to one or more of: scaling processing, cropping processing, size adjustment processing, turnover processing, color dithering processing, grayscale processing, denoising processing, etc. In practical applications, an appropriate preprocessing method may be selected according to actual needs, to process the collected image.

Figure 2A:
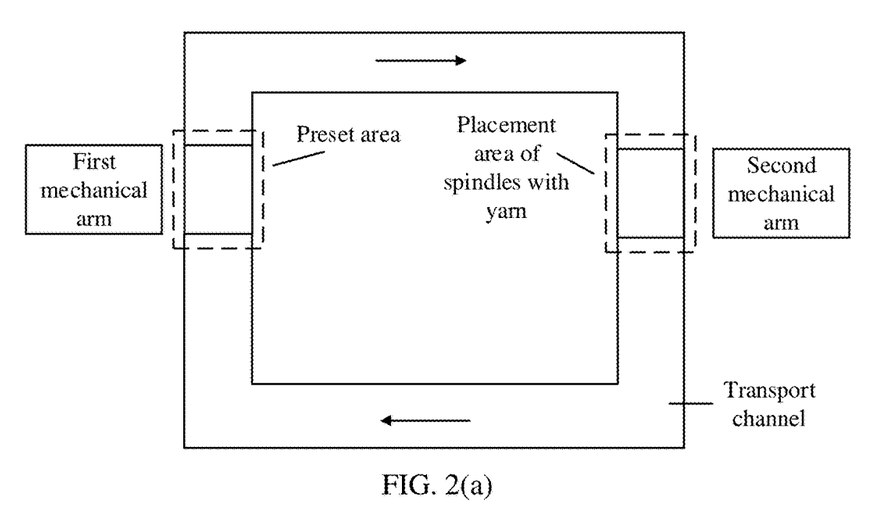
FIG. 2(a) and FIG. 2(b) are schematic diagrams of application scenarios of the control method in an example according to an embodiment of the present application.

Here, it should be noted that the preset area is at least a partial area on the transport channel in one example. For example, as shown in FIG. 2(a), the second robotic arm may grab the first spindle with yarn from the target trolley associated with the first identifier of the first spindle with yarn, and place the first spindle with yarn on the empty yarn placement tray in the placement area of spindles with yarn; and the transport channel transports the yarn placement tray with the first spindle with yarn placed from the placement area of spindles with yarn to the preset area, which is a partial area on the transport channel. The first mechanical arm is used to grab the first spindle with yarn located in the preset area and transfer the grabbed first spindle with yarn to a designated area for palletizing.

It should be noted that there will be an empty yarn placement tray left in the preset area after the first mechanical arm transfers the grabbed first spindle with yarn to the designated area. At this time, the empty yarn placement tray can continue to be transmitted to the transport channel, to continue to be transmitted to the placement area of spindles with yarn to facilitate subsequent automated processing.

Figure 2B:
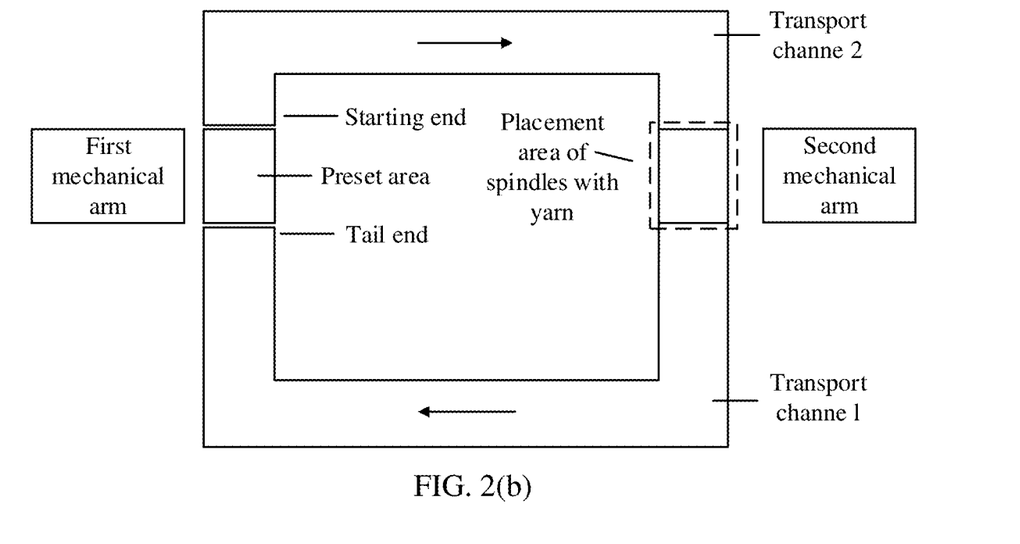

Alternatively, in one example, the preset area is an independent area outside the transport channel. For example, as shown in FIG. 2(b), the second robotic arm grabs the first spindle with yarn from the target trolley associated with the first identifier of the first spindle with yarn, and places the first spindle with yarn on the empty yarn placement tray in the placement area of spindles with yarn; the transport channel 1 is used to transport the yarn placement tray with the spindle with yarn placed from the placement area of spindles with yarn to the preset area; and the first mechanical arm is used to grab the first spindle with yarn located in the preset area and transfer the grabbed first spindle with yarn to a designated area for palletizing.

It should be noted that there will be an empty yarn placement tray left in the preset area after the first mechanical arm transfers the grabbed first spindle with yarn to the designated area. At this time, the empty yarn placement tray can be transferred to the transport channel 2, and sent back to the placement area of spindles with yarn through the transport channel 2, to continue to be transmitted to the placement area of spindles with yarn to facilitate subsequent automated processing. In this scenario, the preset area is independently located between the tail end of the transport channel 1 and the starting end of the transport channel 2.

In a specific example of the solution of the present disclosure, the first number of first spindles with yarn located in the preset area may be further obtained in the following manner; specifically, the above step of inputting the target image into the target mixture model to obtain the first number of first spindles with yarn located in the preset area, specifically includes:

Step 1: inputting the target image into a first identification model in the target mixture model to obtain at least one sub-image.

Here, the first identification model is used to locate an area where each target body is located in the target image, and obtain a sub-image corresponding to the area where each target body is located within the preset area when determining the area where the target body is located is within the preset area. Furthermore, different sub-images contain different target bodies, and the number of sub-images is related to the number of target bodies, for example, the number of sub-images is the same as the number of target bodies.

That is to say, in the step 1, the first identification model can be used to locate the area where each target body is located in the target image, and then determine whether the area where the target body is located is within the preset area, and finally obtain the sub-image corresponding to the area where each target body is located within the preset area.

In an example, the target body includes at least one of, but not limited to: a spindle with yarn, and a yarn placement tray for placing spindles with yarn.

Figure 3A:
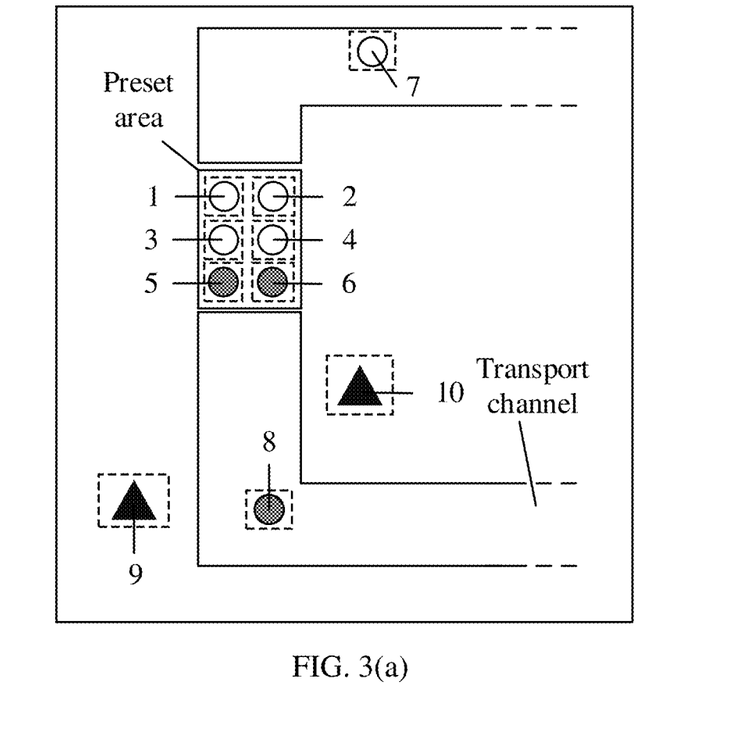
FIG. 3(a) and FIG. 3(b) are schematic diagrams of the control method in a specific scenario according to an embodiment of the present application.

For example, as shown in the FIG. 3(a), there are target bodies 1 to 10 in the target image, where the target bodies 1 to 4 and 7 are all empty yarn placement trays, the target bodies 5, 6 and 8 are all yarn placement trays on which spindles with yarn are placed, and the target bodies 9 and 10 are both objects other than spindles with yarn and yarn placement trays. In this scenario, the first identification model can be used to perform the following process: locating the area where each target body is located in the target image (i.e., the dotted areas containing target bodies in FIG. 3(a)), that is, locating the area where the target body 1 is located, the area where the target body 2 is located, . . . , and the area where the target body 10 is located; and obtaining the areas where the target bodies within the preset area are located, for example, the area where the target body 1 is located to the area where the target body 6 is located; and finally obtaining sub-images of all of the area where the target body 1 is located to the area where the target body 6 is located based on the area where the target body 1 is located to the area where the target body 6 is located. There are a total of 6 sub-images, which are a sub-image 1 corresponding to the area where the target body 1 is located, a sub-image 2 corresponding to the area where the target body 2 is located, a sub-image 3 corresponding to the area where the target body 3 is located, a sub-image 4 corresponding to the area where the target body 4 is located, a sub-image 5 corresponding to the area where the target body 5 is located, a sub-image 6 corresponding to the area where the target body 6 is located, respectively.

Further, in a specific example, the first identification model includes at least a first network layer, a second network layer and a third network layer.

Figure 4:
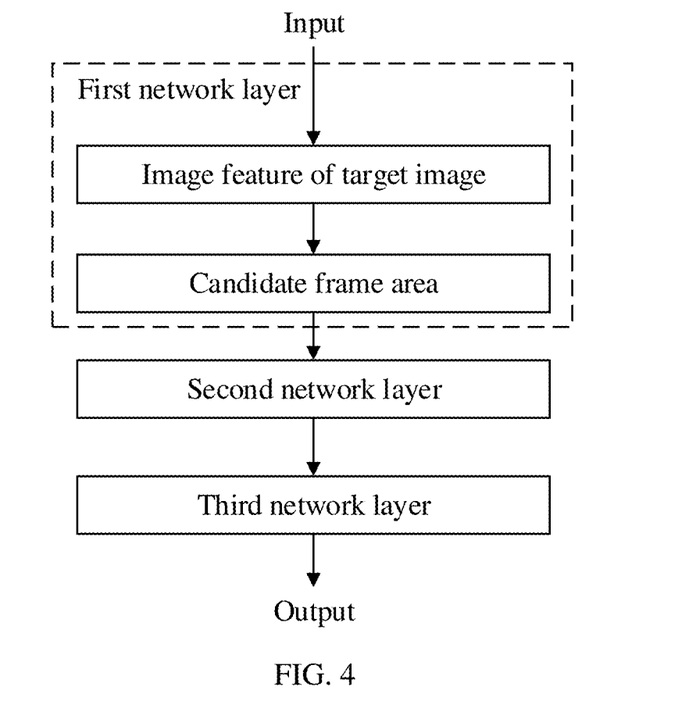
FIG. 4 is a schematic diagram of the processing flow of the first identification model in the control method according to an embodiment of the present application.

Further, as shown in FIG. 4, the first network layer is used to extract an image feature of the target image, and frame an area where a target body is located based on the image feature of the target image, to obtain a candidate frame area; where the candidate frame area is an area that is framed by the candidate frame and includes the target body.

In an example, the first network layer described above may be "feature extractor+Region Proposal Network (RPN)", where the feature extractor is used to extract the image feature of the target image, and the feature extractor may include but not limited to: Recurrent Neural Network (RNN), Convolutional Neural Network (CNN), Transform-based feature extraction network, etc.; and the region proposal network is used to frame the area where the target body is located based on the image feature of the target image, and obtain the candidate frame area.

Further, as shown in FIG. 4, the second network layer is used to filter the candidate frame area obtained in the first network layer, for example, remove a candidate frame that does not meet the requirement (such as a candidate frame with an aspect ratio not meeting a preset aspect ratio requirement), to obtain at least one target frame area; thus, reducing the amount of calculation, and laying the foundation for rapid identification of the subsequent model.

Here, the filtering method may include, but not limited to, determining a filtering condition based on at least one of score, aspect ratio, area, confidence, Non-Maximum Suppression (NMS), etc., to filter the candidate frame area.

Figure 3B:
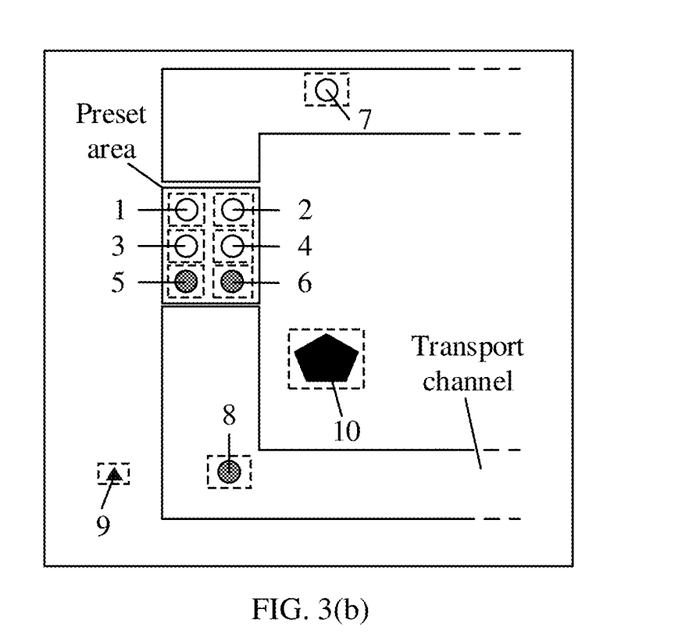

For example, the first network layer is used to obtain the candidate frame area of each of the target body 1 to the target body 10, and the second network layer is used to firstly determine the first aspect ratio corresponding to the candidate frame area of each target body, and secondly remove the candidate frame area with the first aspect ratio not within a preset aspect ratio range, such as shown in FIG. 3(b), remove the candidate frame area of the target body 9 and the candidate frame area of the target body 10, and use the remaining candidate frame areas as the target frame areas.

Further, as shown in FIG. 4, the third network layer is used to determine a first center position of each of the at least one target frame area, select a target frame area of which a first center position has a position relationship with a preset center position of the preset area meeting a preset requirement from the at least one target frame area, and obtain a sub-image corresponding to the target frame area meeting the preset requirement. For example, the center point coordinates of the target frame area are firstly determined. When the distance between the center point coordinates of the target frame area and the center point coordinates of the preset area is less than a preset threshold, the target frame area less than the preset threshold is determined as the target frame area located in the preset area, to thereby obtain a sub-image corresponding to the target frame area less than the preset threshold. Here, the preset threshold is an empirical value and can be set according to actual needs, and is not limited in the solution of the present disclosure.

Step 2: inputting each of the at least one sub-image into a second identification model in the target mixture model to obtain the first number of first spindles with yarn located in the preset area.

Here, the second identification model is used to identify whether a target body contained in the sub-image is a spindle with yarn and also count the number of sub-images in which target bodies are spindles with yarn.

That is to say, in the step 2, the second identification model can be used to identify whether the target body contained in the sub-image is a spindle with yarn, and count the number of sub-images in which target bodies are spindles with yarn.

Continuing to take FIG. 3(a) as an example, each of the obtained sub-images 1 to 6 is input into the second identification model, to identify the target body contained in each sub-image and obtain the identification result of each sub-image, that is, none of the target bodies 1 to 4 are spindles with yarn, the target bodies 5 and 6 are both spindles with yarn, and the counted number of sub-images in which target bodies are spindles with yarn is 2.

Further, in a specific example, the second identification model includes at least a fourth network layer, a fifth network layer and a sixth network layer.

Figure 5:
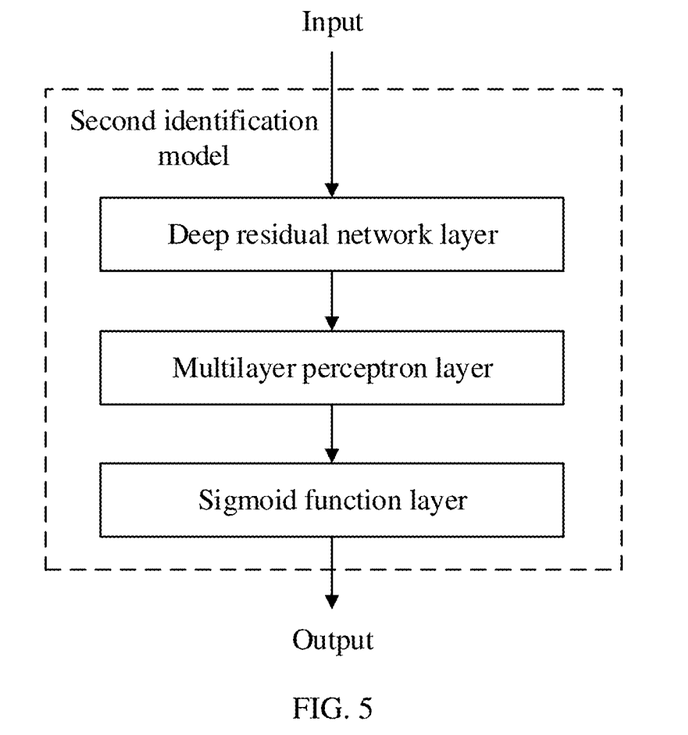
FIG. 5 is a schematic diagram of the processing flow of the second identification model in the control method according to an embodiment of the present application.

Here, as shown in FIG. 5, the fourth network layer is used to perform feature extraction on the sub-image to obtain at least one feature map corresponding to the sub-image, where the number of feature maps in the at least one feature map is inversely related to sizes of feature blocks of the feature maps; and further, in an example, during the feature extraction process performed by the fourth network layer on the sub-image, the size of the feature block of the extracted feature map may be reduced such as to a preset value, so as to increase the number of feature maps, thus obtaining the rich feature information while ensuring the complexity of the model, and thereby improving the accuracy of the model identification result.

Further, as shown in FIG. 5, the fifth network layer is used to predict whether the target body contained in the sub-image is a spindle with yarn based on the at least one feature map corresponding to the sub-image, and obtain a probability value, such as a specific value greater than 0 and less than 1.

Further, as shown in FIG. 5, the sixth network layer is used to process the probability value to obtain a first value or second value; and then count the number of first values. Here, the first value is used to indicate that the target body contained in the sub-image is a spindle with yarn; and the second value is used to indicate that the target body contained in the sub-image is not a spindle with yarn.

For example, in an example, the fourth network layer mentioned above may be a Deep Residual Network (ResNet) layer; further, the fifth network layer mentioned above may be a MultiLayer Perceptron (MLP) layer; and yet further, the sixth network layer may be a nonlinear activation layer, such as a Sigmoid function layer. As shown in FIG. 5, firstly a sub-image in at least one sub-image is input to the ResNet layer in the second identification model, to obtain at least one feature map corresponding to the sub-image; secondly the at least one feature map corresponding to the sub-image is input to the MLP layer, to predict the probability value that the target body in the sub-image is a spindle with yarn; and finally the predicted probability value is input to the Sigmoid layer, to obtain an output result, such as the first value or second value, and count the number of identification results that are the first value.

To sum up, the control method provided in the solution of the present disclosure has the following advantages compared with the prior art, including:

(1) Improve the packaging efficiency of spindles with yarn. The solution of the present disclosure can use the target mixture model to quickly detect the number of spindles with yarn located in the preset area, and can timely replenish the spindles with yarn that match with the currently transported spindles with yarn based on the detection result, thus facilitating smooth automated palletizing, and thereby reducing the labor cost, saving time and further improving the packaging efficiency.

(2) Achieve the complete automated process without human intervention. When the detected number of spindles with yarn located in the preset area is less than the number of spindles with yarn that the first mechanical arm can grab, the solution of the present disclosure can generate the control instruction to automatically replenish the corresponding spindles with yarn, so as to complete the packaging task of spindles with yarn. Compared with the prior art, this process does not require manual intervention, and can realize a complete automated process without human intervention.

(3) Avoid the spindles with yarn with different batch numbers from being mixed and palletized. In the solution of the present disclosure, the automatically replenished spindles with yarn may be spindles with yarn with the same identifier as the currently transported spindles with yarn, thus effectively avoiding the case that the spindles with yarn with different identifiers appear in the preset area where the first mechanical arm is located, thereby avoiding the spindles with yarn with different batch numbers from being palletized together, and further improving the packaging efficiency.

(4) Improve the safety of workshop operations. In the automatic packaging workshop, the solution of the present disclosure realizes the complete automated process without human intervention, so the solution of the present disclosure can provide technical support for reducing the incidence of safety accidents, and then lay the foundation for effectively avoiding personnel injuries, thus ensuring the normal operation of the workshop to a great extent and improving the overall safety of the workshop.

Figure 6:
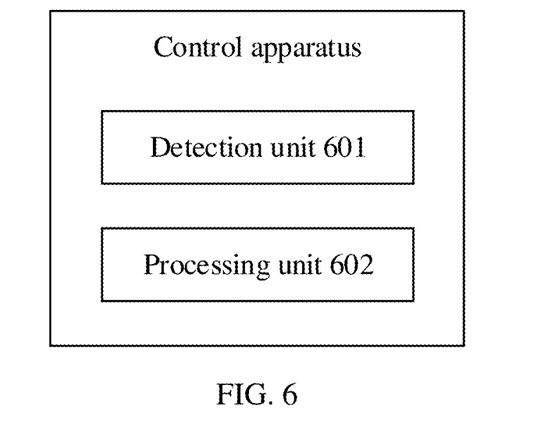
FIG. 6 is a schematic structural diagram of a control apparatus according to an embodiment of the present application.

The solution of the present disclosure further provides a control apparatus, as shown in FIG. 6, including:

a detection unit 601 configured to, when a first spindle with yarn with a first identifier is transported on a transport channel and when determining that the number of first spindles with yarn located in a preset area needs to be detected, detect the first number of first spindles with yarn located in the preset area; where the transport channel is a channel for transporting spindles with yarn in an automatic packaging workshop and is used to transport the transported spindles with yarn to the preset area; the preset area is a working area radiated by a first mechanical arm; and the first mechanical arm is used to grab a plurality of spindles with yarn in the radiated working area and transfer the plurality of spindles with yarn grabbed to a target position; and a processing unit 602 configured to, when the first number of first spindles with yarn located in the preset area is less than the total number of spindles with yarn that the first mechanical arm can grab, determine the target number of first spindles with yarn that need to be replenished, and generate a first control instruction; where the first control instruction is used to instruct a second mechanical arm to grab the target number of first spindles with yarn from a target trolley associated with the first identifier of the first spindle with yarn, and place the target number of first spindles with yarn in the transport channel or preset area.

In a specific example of the solution of the present disclosure, the detection unit is specifically configured to perform one of:

when the first spindle with yarn with the first identifier is transported on the transport channel and when determining that a second spindle with yarn with a second identifier needs to be continuously transported, detect the first number of first spindles with yarn located in the preset area; where the second identifier is different from the first identifier;

when the first spindle with yarn with the first identifier is transported on the transport channel and when determining that the first spindle with yarn currently placed on the transport channel is a last first spindle with yarn, detect the first number of first spindles with yarn located in the preset area; and when the first spindle with yarn with the first identifier is transported on the transport channel and when determining that the total number of first spindles with yarn transported by the transport channel does not reach a preset maximum number that the transport channel can carry, detect the first number of first spindles with yarn located in the preset area.

In a specific example of the solution of the present disclosure, the detection unit is specifically configured to:

obtain a collected target image containing the preset area; and input the target image into a target mixture model to obtain the first number of first spindles with yarn located in the preset area; where the target mixture model is used to detect the number of spindles with yarn located in the preset area in the target image.

In a specific example of the solution of the present disclosure, the detection unit is specifically configured to:

input the target image into a first identification model in the target mixture model to obtain at least one sub-image; where the first identification model is used to locate an area where each target body is located in the target image, and obtain a sub-image corresponding to the area where each target body is located within the preset area when determining the area where the target body is located is within the preset area; where different sub-images contain different target bodies, and the number of sub-images is related to the number of target bodies; and input each of the at least one sub-image into a second identification model to obtain the first number of first spindles with yarn located in the preset area; where the second identification model is used to identify whether a target body contained in the sub-image is a spindle with yarn and also count the number of sub-images in which target bodies are spindles with yarn.

In a specific example of the solution of the present disclosure, the first identification model includes at least a first network layer, a second network layer and a third network layer;

where the first network layer is used to extract an image feature of the target image, and frame an area where a target body is located based on the image feature of the target image, to obtain a candidate frame area;

the second network layer is used to filter the candidate frame area obtained by the first network layer to obtain at least one target frame area; and the third network layer is used to determine a first center position of each of the at least one target frame area, select a target frame area of which a first center position has a position relationship with a preset center position of the preset area meeting a preset requirement from the at least one target frame area, and obtain a sub-image corresponding to the target frame area meeting the preset requirement.

In a specific example of the solution of the present disclosure, the second identification model includes at least a fourth network layer, a fifth network layer and a sixth network layer;

where the fourth network layer is used to perform feature extraction on the sub-image to obtain at least one feature map corresponding to the sub-image, where the number of feature maps in the at least one feature map is inversely related to sizes of feature blocks of the feature maps;

the fifth network layer is used to predict whether the target body contained in the sub-image is a spindle with yarn based on the at least one feature map corresponding to the sub-image, and obtain a probability value; and the sixth network layer is used to process the probability value, obtain a first value or second value, and count the number of first values; where the first value is used to indicate that the target body contained in the sub-image is a spindle with yarn; and the second value is used to indicate that the target body contained in the sub-image is not a spindle with yarn.

In a specific example of the solution of the present disclosure, the processing unit is further configured to:

when the first number of first spindles with yarn located in the preset area is equal to the total number of spindles with yarn that the first mechanical arm can grab and the transport channel also transports other first spindles with yarn, generate a second control instruction, where the second control instruction is used to instruct the first mechanical arm to re-detect the first number of first spindles with yarn located in the preset area after completing a grabbing task;

or when the first number of first spindles with yarn located in the preset area is equal to the total number of spindles with yarn that the first mechanical arm can grab and there is no first spindle with yarn in the transport channel, generate a third control instruction, where the third control instruction is used to instruct the first mechanical arm to stop running. For the description of specific functions and examples of the units of the apparatus of the embodiment of the present disclosure, reference may be made to the relevant description of the corresponding steps in the above-mentioned method embodiments, and details are not repeated here.

In the technical solution of the present disclosure, the acquisition, storage and application of the user's personal information involved are in compliance with relevant laws and regulations, and do not violate public order and good customs.

Figure 7:
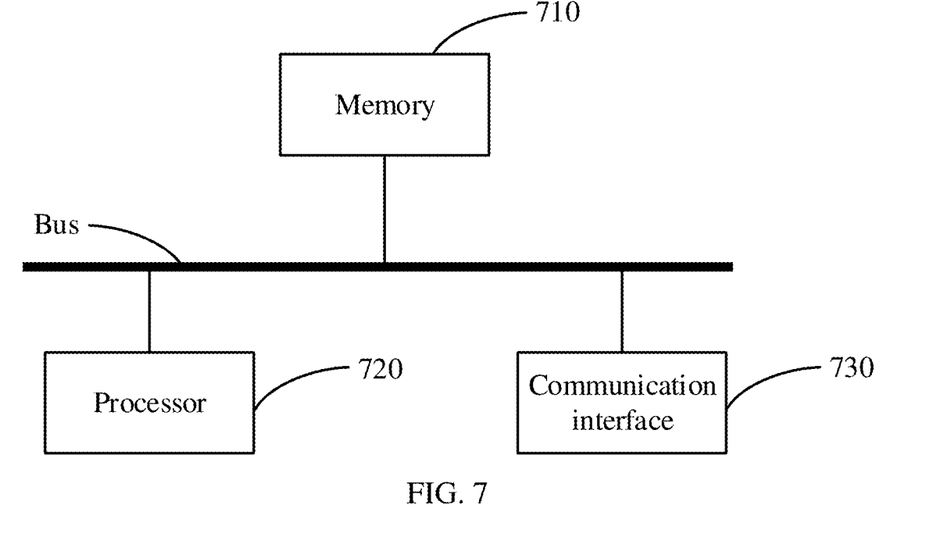
FIG. 7 is a block diagram of an electronic device for implementing the control method of the embodiment of the present disclosure.

FIG. 7 is a structural block diagram of an electronic device according to an embodiment of the present disclosure. As shown in FIG. 7, the electronic device includes: a memory 710 and a processor 720, and the memory 710 stores a computer program that can run on the processor 720. There may be one or more memories 710 and processors 720. The memory 710 may store one or more computer programs, and the one or more computer programs cause the electronic device to perform the method provided in the above method embodiment, when executed by the electronic device. The electronic device may also include: a communication interface 730 configured to communicate with an external device for data interactive transmission.

If the memory 710, the processor 720 and the communication interface 730 are implemented independently, the memory 710, the processor 720 and the communication interface 730 may be connected to each other and complete communication with each other through a bus. The bus may be an Industry Standard Architecture (ISA) bus, a Peripheral Component Interconnect (PCI) bus, or an Extended Industry Standard Architecture (EISA) bus, etc. The bus may be divided into address bus, data bus, control bus, etc. For ease of representation, the buses are represented by only one thick line in FIG. 7, but it does not represent only one bus or only one type of bus.

Optionally, in a specific implementation, if the memory 710, the processor 720 and the communication interface 730 are integrated on one chip, the memory 710, the processor 720 and the communication interface 730 may communicate with each other through an internal interface.

It should be understood that the above-mentioned processor may be a Central Processing Unit (CPU) or other general-purpose processor, a Digital Signal Processor (DSP), an Application Specific Integrated Circuit (ASIC), a Field Programmable Gate Array (FPGA) or other programmable logic device, a discrete gate or transistor logic device, a discrete hardware component, etc. The general-purpose processor may be a microprocessor or any conventional processor, etc. It is worth noting that the processor may be a processor that supports the Advanced RISC Machines (ARM) architecture.

Further, optionally, the above-mentioned memory may include a read-only memory and a random-access memory, and may also include a non-volatile random-access memory. The memory may be a volatile memory or a non-volatile memory, or may include both a volatile memory and a non-volatile memory. Here, the non-volatile memory may include a Read-Only Memory (ROM), a Programmable ROM (PROM), an Erasable PROM (EPROM), an Electrically EPROM (EEPROM) or a flash memory. The volatile memory may include a Random Access Memory (RAM), which acts as an external cache. By way of illustration and not limitation, many forms of RAMs are available, for example, Static RAM (SRAM), Dynamic Random Access Memory (DRAM), Synchronous DRAM (SDRAM), Double Data Date SDRAM (DDR SDRAM), Enhanced SDRAM (ESDRAM), Synchlink DRAM (SLDRAM) and Direct RAMBUS RAM (DR RAM).

The above embodiments may be implemented in whole or in part by software, hardware, firmware or any combination thereof. When implemented by software, they may be implemented in the form of a computer program product in whole or in part. The computer program product includes one or more computer instructions. When the computer instructions are loaded and executed on a computer, the processes or functions described in the embodiments of the present disclosure are generated in whole or in part. The computer may be a general-purpose computer, a special-purpose computer, a computer network, or other programmable device. The computer instructions may be stored in a computer readable storage medium or transmitted from a computer readable storage medium to another computer readable storage medium. For example, the computer instructions may be transmitted from a website, computer, server or data center to another website, computer, server or data center in a wired (e.g., coaxial cable, optical fiber, Digital Subscriber Line (DSL)) or wireless (e.g., infrared, Bluetooth, microwave, etc.) way. The computer readable storage medium may be any available medium that can be accessed by a computer, or a data storage device such as server or data center that is integrated with one or more available media. The available media may be magnetic media (for example, floppy disk, hard disk, magnetic tape), optical media (for example, Digital Versatile Disc (DVD)), or semiconductor media (for example, Solid State Disk (SSD)), etc. It is worth noting that the computer readable storage medium mentioned in the present disclosure may be a non-volatile storage medium, in other words, may be a non-transitory storage medium.

Those having ordinary skill in the art can understand that all or some of the steps for implementing the above embodiments may be completed by hardware, or may be completed by instructing related hardware through a program. The program may be stored in a computer readable storage medium. The above-mentioned storage medium may be a read-only memory, a magnetic disk or an optical disk, etc.

In the description of the embodiments of the present disclosure, the description with reference to the terms "one embodiment", "some embodiments", "example", "specific example" or "some examples", etc. means that specific features, structures, materials or characteristics described in conjunction with the embodiment or example are included in at least one embodiment or example of the present disclosure. Moreover, the specific features, structures, materials or characteristics described may be combined in a suitable manner in any one or more embodiments or examples. In addition, those skilled in the art can integrate and combine different embodiments or examples and features of different embodiments or examples described in this specification without conflicting with each other.

In the description of the embodiments of the present disclosure, "I" represents or, unless otherwise specified. For example, A/B may represent A or B. The term "and/or" herein only describes an association relation of associated objects, which indicates that there may be three kinds of relations, for example, A and/or B may indicate that only A exists, or both A and B exist, or only B exists.

In the description of the embodiments of the present disclosure, the terms "first" and "second" are only for purpose of description, and cannot be construed to indicate or imply the relative importance or implicitly point out the number of technical features indicated. Therefore, the feature defined with "first" or "second" may explicitly or implicitly include one or more features. In the description of the embodiments of the present disclosure, "multiple" means two or more, unless otherwise specified.

The above descriptions are only exemplary embodiments of the present disclosure and not intended to limit the present disclosure. Any modifications, equivalent replacements, improvements and others made within the spirit and principle of the present disclosure shall be contained in the protection scope of the present disclosure.

What is claimed is:

1. A control method, comprising:
   in a case of a first spindle with yarn with a first identifier is transported on a transport channel and it is determined that a first number of first spindles with yarn located in a preset area needs to be detected, detecting the first number of first spindles with yarn located in the preset area; wherein the transport channel is a channel for transporting spindles with yarn in an automatic packaging workshop and is used to transport the transported spindles with yarn to the preset area; the preset area is a working area radiated by a first mechanical arm; and the first mechanical arm is used to grab a plurality of spindles with yarn in the radiated working area and transfer the plurality of spindles with yarn grabbed to a target position; and
   in a case of the first number of first spindles with yarn located in the preset area is less than a total number of spindles with yarn that the first mechanical arm can grab, determining a target number of first spindles with yarn that need to be replenished, and generating a first control instruction; wherein the first control instruction is used to instruct a second mechanical arm to grab the target number of first spindles with yarn from a target trolley associated with the first identifier of the first spindle with yarn, and place the target number of first spindles with yarn in the transport channel or preset area.

2. The method of claim 1, wherein in the case of the first spindle with yarn with the first identifier is transported on the transport channel and it is determined that the first number of first spindles with yarn located in the preset area needs to be detected, detecting the first number of first spindles with yarn located in the preset area, comprises one of:
   in a case of the first spindle with yarn with the first identifier is transported on the transport channel and it is determined that a second spindle with yarn with a second identifier needs to be continuously transported, detecting the first number of first spindles with yarn located in the preset area; wherein the second identifier is different from the first identifier;
   in a case of the first spindle with yarn with the first identifier is transported on the transport channel and it is determined that the first spindle with yarn currently placed on the transport channel is a last first spindle with yarn, detecting the first number of first spindles with yarn located in the preset area; and
   in a case of the first spindle with yarn with the first identifier is transported on the transport channel and it is determined that a total number of first spindles with yarn transported by the transport channel does not reach a preset maximum number that the transport channel can carry, detecting the first number of first spindles with yarn located in the preset area.

3. The method of claim 1, wherein detecting the first number of first spindles with yarn located in the preset area, comprises:
   obtaining a target image containing the preset area; and
   inputting the target image into a target mixture model to obtain the first number of first spindles with yarn located in the preset area; wherein the target mixture model is used to detect a number of spindles with yarn located in the preset area in the target image.

4. The method of claim 3, wherein inputting the target image into the target mixture model to obtain the first number of first spindles with yarn located in the preset area, comprises:
   inputting the target image into a first identification model in the target mixture model to obtain at least one sub-image; wherein the first identification model is used to locate an area where a target body is located in the target image, and obtain a sub-image corresponding to the area where the target body is located within the preset area if it is determined the area where the target body is located is within the preset area; wherein different sub-images contain different target bodies, and a number of sub-images is related to a number of target bodies; and
   inputting each of the at least one sub-image into a second identification model in the target mixture model to obtain the first number of first spindles with yarn located in the preset area; wherein the second identification model is used to identify whether a target body contained in the sub-image is a spindle with yarn and also count the number of sub-images in which target bodies are spindles with yarn.

5. The method of claim 4, wherein the first identification model comprises at least a first network layer, a second network layer and a third network layer;
   wherein the first network layer is used to extract an image feature of the target image, and frame an area where a target body is located based on the image feature of the target image, to obtain a candidate frame area;
   the second network layer is used to filter the candidate frame area obtained by the first network layer to obtain at least one target frame area; and
   the third network layer is used to determine a first center position of each of the at least one target frame area, select a target frame area of which a first center position has a position relationship with a preset center position of the preset area meeting a preset requirement from the at least one target frame area, and obtain a sub-image corresponding to the target frame area meeting the preset requirement.

6. The method of claim 4, wherein the second identification model comprises at least a fourth network layer, a fifth network layer and a sixth network layer;

wherein the fourth network layer is used to perform feature extraction on the sub-image to obtain at least one feature map corresponding to the sub-image, wherein a number of feature maps in the at least one feature map is inversely related to sizes of feature blocks of the at least one feature map;

the fifth network layer is used to predict whether the target body contained in the sub-image is a spindle with yarn based on the at least one feature map corresponding to the sub-image, and obtain a probability value; and the sixth network layer is used to process the probability value, obtain a first value or second value, and count a number of first values; wherein the first value is used to indicate that the target body contained in the sub-image is a spindle with yarn; and the second value is used to indicate that the target body contained in the sub-image is not a spindle with yarn.

7. The method of claim 1, further comprising:

in a case of the first number of first spindles with yarn located in the preset area is equal to the total number of spindles with yarn that the first mechanical arm can grab and the transport channel also transports other first spindles with yarn, generating a second control instruction, wherein the second control instruction is used to instruct the first mechanical arm to re-detect the first number of first spindles with yarn located in the preset area after completing a grabbing task.

8. The method of claim 1, further comprising:

in a case of the first number of first spindles with yarn located in the preset area is equal to the total number of spindles with yarn that the first mechanical arm can grab and there is no first spindle with yarn in the transport channel, generating a third control instruction, wherein the third control instruction is used to instruct the first mechanical arm to stop running.

9. An electronic device, comprising:

at least one processor; and a memory connected in communication with the at least one processor;

wherein the memory stores an instruction executable by the at least one processor, and the instruction, when executed by the at least one processor, enables the at least one processor to execute:

in a case of a first spindle with yarn with a first identifier is transported on a transport channel and it is determined that a first number of first spindles with yarn located in a preset area needs to be detected, detecting the first number of first spindles with yarn located in the preset area; wherein the transport channel is a channel for transporting spindles with yarn in an automatic packaging workshop and is used to transport the transported spindles with yarn to the preset area; the preset area is a working area radiated by a first mechanical arm; and the first mechanical arm is used to grab a plurality of spindles with yarn in the radiated working area and transfer the plurality of spindles with yarn grabbed to a target position; and in a case of the first number of first spindles with yarn located in the preset area is less than a total number of spindles with yarn that the first mechanical arm can grab, determining a target number of first spindles with yarn that need to be replenished, and generating a first control instruction; wherein the first control instruction is used to instruct a second mechanical arm to grab the target number of first spindles with yarn from a target trolley associated with the first identifier of the first spindle with yarn, and place the target number of first spindles with yarn in the transport channel or preset area.

10. The electronic device of claim 9, wherein the instruction, when executed by the at least one processor, enables the at least one processor to execute one of:

in a case of the first spindle with yarn with the first identifier is transported on the transport channel and it is determined that a second spindle with yarn with a second identifier needs to be continuously transported, detecting the first number of first spindles with yarn located in the preset area; wherein the second identifier is different from the first identifier;

in a case of the first spindle with yarn with the first identifier is transported on the transport channel and it is determined that the first spindle with yarn currently placed on the transport channel is a last first spindle with yarn, detecting the first number of first spindles with yarn located in the preset area; and in a case of the first spindle with yarn with the first identifier is transported on the transport channel and it is determined that a total number of first spindles with yarn transported by the transport channel does not reach a preset maximum number that the transport channel can carry, detecting the first number of first spindles with yarn located in the preset area.

11. The electronic device of claim 9, wherein the instruction, when executed by the at least one processor, enables the at least one processor to execute:

obtaining a target image containing the preset area; and inputting the target image into a target mixture model to obtain the first number of first spindles with yarn located in the preset area; wherein the target mixture model is used to detect a number of spindles with yarn located in the preset area in the target image.

12. The electronic device of claim 11, wherein the instruction, when executed by the at least one processor, enables the at least one processor to execute:

inputting the target image into a first identification model in the target mixture model to obtain at least one sub-image; wherein the first identification model is used to locate an area where a target body is located in the target image, and obtain a sub-image corresponding to the area where the target body is located within the preset area if it is determined the area where the target body is located is within the preset area; wherein different sub-images contain different target bodies, and a number of sub-images is related to a number of target bodies; and inputting each of the at least one sub-image into a second identification model in the target mixture model to obtain the first number of first spindles with yarn located in the preset area; wherein the second identification model is used to identify whether a target body contained in the sub-image is a spindle with yarn and also count the number of sub-images in which target bodies are spindles with yarn.

13. The electronic device of claim 12, wherein the first identification model comprises at least a first network layer, a second network layer and a third network layer;
    wherein the first network layer is used to extract an image feature of the target image, and frame an area where a target body is located based on the image feature of the target image, to obtain a candidate frame area;
    the second network layer is used to filter the candidate frame area obtained by the first network layer to obtain at least one target frame area; and
    the third network layer is used to determine a first center position of each of the at least one target frame area, select a target frame area of which a first center position has a position relationship with a preset center position of the preset area meeting a preset requirement from the at least one target frame area, and obtain a sub-image corresponding to the target frame area meeting the preset requirement.

14. The electronic device of claim 12, wherein the second identification model comprises at least a fourth network layer, a fifth network layer and a sixth network layer;
    wherein the fourth network layer is used to perform feature extraction on the sub-image to obtain at least one feature map corresponding to the sub-image, wherein a number of feature maps in the at least one feature map is inversely related to sizes of feature blocks of the at least one feature map;
    the fifth network layer is used to predict whether the target body contained in the sub-image is a spindle with yarn based on the at least one feature map corresponding to the sub-image, and obtain a probability value; and
    the sixth network layer is used to process the probability value, obtain a first value or second value, and count a number of first values; wherein the first value is used to indicate that the target body contained in the sub-image is a spindle with yarn; and the second value is used to indicate that the target body contained in the sub-image is not a spindle with yarn.

15. A non-transitory computer-readable storage medium storing a computer instruction thereon, wherein the computer instruction is used to cause a computer to execute:
    in a case of a first spindle with yarn with a first identifier is transported on a transport channel and it is determined that a first number of first spindles with yarn located in a preset area needs to be detected, detecting the first number of first spindles with yarn located in the preset area; wherein the transport channel is a channel for transporting spindles with yarn in an automatic packaging workshop and is used to transport the transported spindles with yarn to the preset area; the preset area is a working area radiated by a first mechanical arm; and the first mechanical arm is used to grab a plurality of spindles with yarn in the radiated working area and transfer the plurality of spindles with yarn grabbed to a target position; and
    in a case of the first number of first spindles with yarn located in the preset area is less than a total number of spindles with yarn that the first mechanical arm can grab, determining a target number of first spindles with yarn that need to be replenished, and generating a first control instruction; wherein the first control instruction is used to instruct a second mechanical arm to grab the target number of first spindles with yarn from a target trolley associated with the first identifier of the first spindle with yarn, and place the target number of first spindles with yarn in the transport channel or preset area.

16. The storage medium of claim 15, wherein the computer instruction is used to cause a computer to execute one of:
    in a case of the first spindle with yarn with the first identifier is transported on the transport channel and it is determined that a second spindle with yarn with a second identifier needs to be continuously transported, detecting the first number of first spindles with yarn located in the preset area; wherein the second identifier is different from the first identifier;
    in a case of the first spindle with yarn with the first identifier is transported on the transport channel and it is determined that the first spindle with yarn currently placed on the transport channel is a last first spindle with yarn, detecting the first number of first spindles with yarn located in the preset area; and
    in a case of the first spindle with yarn with the first identifier is transported on the transport channel and it is determined that a total number of first spindles with yarn transported by the transport channel does not reach a preset maximum number that the transport channel can carry, detecting the first number of first spindles with yarn located in the preset area.

17. The storage medium of claim 15, wherein the computer instruction is used to cause a computer to execute:
    obtaining a target image containing the preset area; and
    inputting the target image into a target mixture model to obtain the first number of first spindles with yarn located in the preset area; wherein the target mixture model is used to detect a number of spindles with yarn located in the preset area in the target image.

18. The storage medium of claim 17, wherein the computer instruction is used to cause a computer to execute:
    inputting the target image into a first identification model in the target mixture model to obtain at least one sub-image; wherein the first identification model is used to locate an area where a target body is located in the target image, and obtain a sub-image corresponding to the area where the target body is located within the preset area if it is determined the area where the target body is located is within the preset area; wherein different sub-images contain different target bodies, and a number of sub-images is related to a number of target bodies; and
    inputting each of the at least one sub-image into a second identification model in the target mixture model to obtain the first number of first spindles with yarn located in the preset area; wherein the second identification model is used to identify whether a target body contained in the sub-image is a spindle with yarn and also count the number of sub-images in which target bodies are spindles with yarn.

19. The storage medium of claim 18, wherein the first identification model comprises at least a first network layer, a second network layer and a third network layer;
    wherein the first network layer is used to extract an image feature of the target image, and frame an area where a target body is located based on the image feature of the target image, to obtain a candidate frame area;
    the second network layer is used to filter the candidate frame area obtained by the first network layer to obtain at least one target frame area; and
    the third network layer is used to determine a first center position of each of the at least one target frame area, select a target frame area of which a first center position has a position relationship with a preset center position of the preset area meeting a preset requirement from the at least one target frame area, and obtain a sub-image corresponding to the target frame area meeting the preset requirement.

20. The storage medium of claim 18, wherein the second identification model comprises at least a fourth network layer, a fifth network layer and a sixth network layer;

wherein the fourth network layer is used to perform feature extraction on the sub-image to obtain at least one feature map corresponding to the sub-image, wherein a number of feature maps in the at least one feature map is inversely related to sizes of feature blocks of the at least one feature map;

the fifth network layer is used to predict whether the target body contained in the sub-image is a spindle with yarn based on the at least one feature map corresponding to the sub-image, and obtain a probability value; and the sixth network layer is used to process the probability value, obtain a first value or second value, and count a number of first values; wherein the first value is used to indicate that the target body contained in the sub-image is a spindle with yarn; and the second value is used to indicate that the target body contained in the sub-image is not a spindle with yarn.

* * * * *